July 28, 1925.
C. A. BODDIE
POWER FACTOR REGULATOR
Filed Dec. 3, 1919
1,547,728
*Fig. 1.*
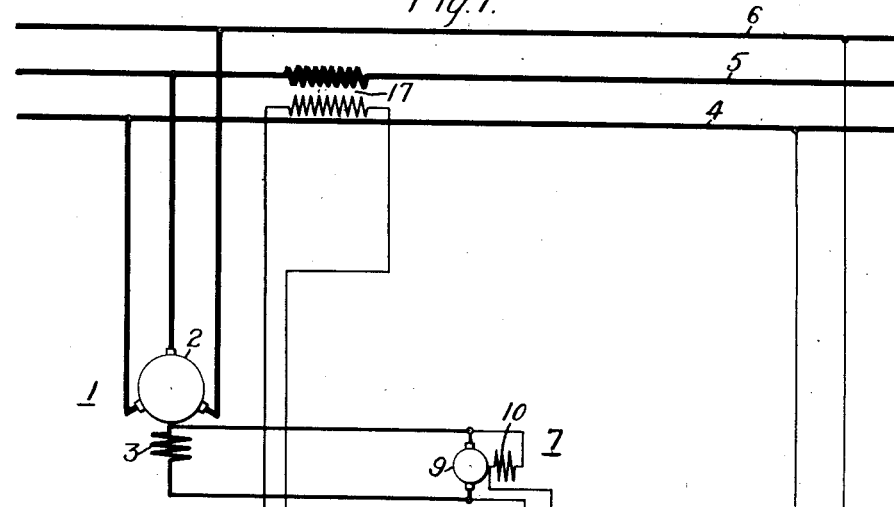
*Fig. 2.*
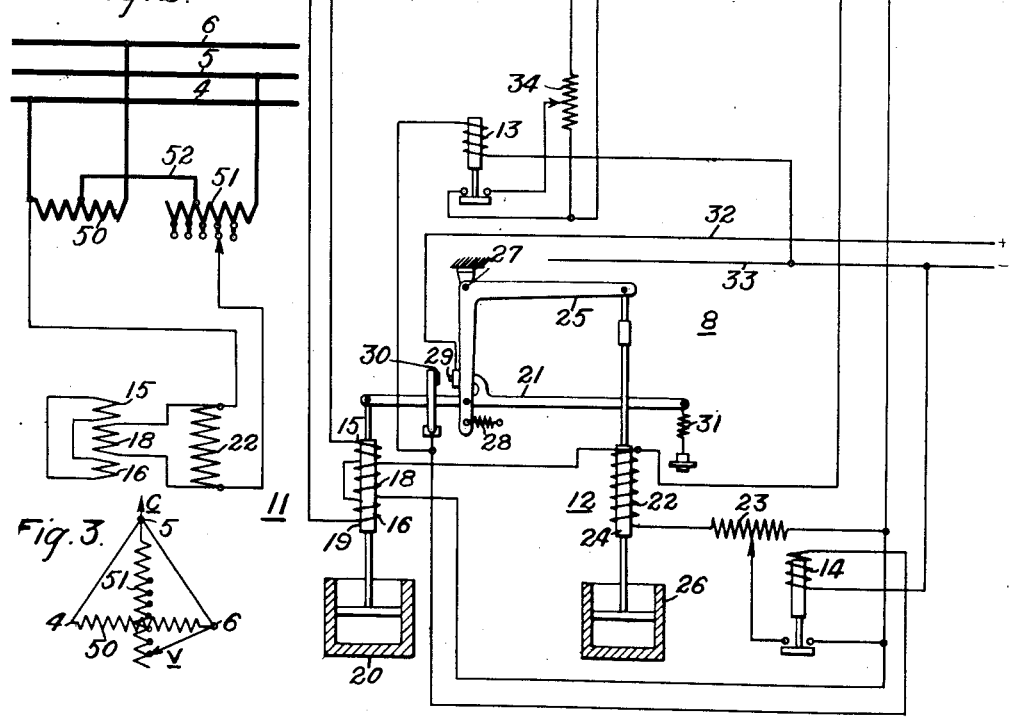
*Fig. 3.*
WITNESSES:
J. A. Helsel
W. B. Wells
INVENTOR
Clarence A. Boddie.
BY
Wesley G. Carr
ATTORNEY Patented July 28, 1925.

1,547,728

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

POWER-FACTOR REGULATOR.

Application filed December 3, 1919. Serial No. 342,176.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Power-Factor Regulators, of which the following is a specification.

My invention relates to power-factor regulators and particularly to power-factor regulators for governing the excitation of synchronous condensers that are connected to supply circuits.

One object of my invention is to provide a power-factor regulator of the vibratory type that shall be controlled by supply-circuit conditions to so govern the excitation of a synchronous condenser as to maintain a constant power factor on the supply circuit.

Another object of my invention is to provide a regulator of the above-indicated character that shall embody a main magnet having a single core armature operated by three windings in accordance with the supply-circuit conditions and a vibratory magnet which co-operates with the main magnet for varying the excitation of a synchronous condenser.

In practicing my invention for controlling the power factor of a three-phase supply circuit, two windings of the main magnet are energized in accordance with the current flowing through one of the three-phase conductors, and the third winding of the main magnet is located between the two current windings and is connected across the two three-phase conductors adjacent to the conductor which is connected to the two current windings. A pair of main contacts are governed by the main magnet for controlling the excitation of the synchronous condenser and for varying the energization of the auxiliary magnet to effect a vibratory action of the main contacts. If it is desired to vary the power factor which is maintained on the supply circuit, the potential winding is connected across the supply circuit by means of a Scott connection, and the connection is so varied as to operate the regulator to maintain any desired vector relation between the current and the voltage on the supply circuit.

In the accompanying drawing, Figure 1 is a diagrammatic view of a power-factor-regulator system embodying my invention, and Figs. 2 and 3 illustrate means for varying the system shown in Fig. 1 to maintain any desired power factor on the supply circuit.

Referring to Fig. 1 of the drawing, a synchronous condenser 1, comprising an armature 2, and a field-magnet winding 3, is connected to a supply circuit comprising conductors 4, 5 and 6. The field-magnet winding 3 is energized by an exciter 7 which is controlled by a regulator 8 in accordance with the current and the voltage conditions obtaining in the supply circuit. The exciter 7 comprises an armature 9 and a field-magnet winding 10.

The regulator 8 comprises a main magnet 11, an auxiliary vibratory magnet 12, and two relays 13 and 14, which are jointly controlled by the main and the auxiliary magnet. The main magnet 11 embodies two current windings 15 and 16 which are connected to the three-phase supply conductor 5 by means of a current transformer 17 and a potential winding 18 which is located between the two current windings 15 and 16. The three windings 15, 16 and 18 operate a core armature 19 which is provided with a dash pot 20 and is pivotally connected to a contact arm 21. The winding 18 is directly connected across the three-phase conductors 4 and 6.

The auxiliary magnet 12 comprises a winding 22 which is connected, in series with the resistor 23, across the supply conductors 4 and 6 and a core armature 24 which is pivotally connected to a bell-crank lever arm 25. The core armature 24 is provided with a dash pot 26 for adjusting the speed of its operation.

The bell-crank-lever arm 25 is fulcrumed at 27 and is provided with a spring 28 for counter-balancing a portion of the weight of the core armature 24. The contact arm 21 is pivotally mounted on the bell-crank lever 25 and carries a main contact member 29. The contact member 29 co-operates with a stationary contact member 30 to govern the operation of the two relays 13 and 14. A weighted spring 31 is attached to the contact arm 21 for counter-balancing a portion of the weight of the core armature 19.

Upon engagement between the contact members 29 and 30, the relays 13 and 14 are energized by a circuit which extends from the auxiliary supply conductors 32 and 33.

The relay 13, upon operation, serves to short-circuit a portion of a resistor 34 which is included in circuit with the exciter field winding 10. The relay 14, when energized, serves to short-circuit a portion of the resistor 23 for varying the excitation of the auxiliary magnet to effect a vibratory operation of the main contact member 29. It will be noted that the current coils 15 and 16 are wound in opposition to each other and are so disposed upon the core armature 19 as to have the respective opposing magnetic fields thereof exactly balance each other. These coils are energized from the single-phase current transformer 17. The voltage coil 18 is also disposed upon the core armature 19, but is located between the current coils 15 and 16, and is energized by a single-phase connection across the supply-circuit conductors 4 and 6. This coil sets up a magnetic field which polarizes the core armature 19 in accordance with the direction of current flow through the coil. It will be further noted that the magnet 11 comprises a single core armature having disposed thereupon the three stationary coils.

However, the current windings 15 and 16 and the potential winding 18 are so disposed on the core armature 19 as to prevent operation of the main magnet by either the current windings or the potential winding when independently energized. Moreover, the current and potential windings are so connected to the supply conductors 4, 5 and 6, as to prevent operation of the main magnet 11 when a one-hundred-per cent power factor obtains upon the supply circuit. In other words, when a one-hundred-per cent power factor is maintained on the supply circuit, the current flowing through the windings 15 and 16 and the current flowing through the winding 18 have a vector relation of ninety degrees which, of course, prevents any operation of the main magnet 11 by the joint excitation of the current and the potential windings.

Energizing the coil 18 alone will cause the center of the core 19 to coincide with the center of the coil 18, and energizing the coils 15 and 16 alone will cause the center of the core 19 to coincide with the center of the coils 15 and 16, but inasmuch as the coils 15 and 16 are differentially wound and disposed on opposite sides of the coil 18, the magnetic centers of the coils 15 and 16 coincide with the magnetic center of the coil 18.

The effect of the winding 18 is to polarize the core 19. Let us consider the conditions at an instant when the current flow would produce a north pole at one end of the core 19 and a south pole at the other end. Also let us suppose a phase relation between the current flowing in the windings 15 and 16 and the current flowing in the winding 18 other than 90 degrees. The flux produced by the winding 15 is always opposite to that produced by the winding 15 because of their differential relation. Now, if the phase relation of the two currents is such that the polarity of the flux produced by the coil 15 corresponds to the polarity of the flux produced by the coil 18, the three coils will raise the center of flux above that produced by the circuits separately. Again, considering the conditions at an instant corresponding to a half cycle advance in the currents, the direction of the flux created by the coil 18 will have reversed, as will also the direction of the flux from each of the coils 15 and 16. At this instant, as at a half cycle earlier, the flux from the coil 15 will correspond in polarity to that from the coil 18, and the flux from the coil 16 will oppose that from the coil 18, so that the center of flux created by the three coils will not have altered its position as a result of the reversal of the currents of the two circuits.

At a 90 degree phase relation between currents of the two circuits, since one current passes through zero while the other is a maximum, there will be no shifting of the point of concentration of flux from the center of the three coils. Should, however, the phase relation of the currents in the two circuits vary from 90 degrees by decreasing the phase angle between the currents, it would cause the point of concentration of flux to shift in one direction, and should the phase relation of the two currents vary from 90 degrees by increasing the phase angle between them, it would cause the point of concentration of flux to shift in the other direction. It will be apparent, therefore, that where the currents supplied to the two circuits are of the same frequency, the coil 18 polarizes the magnet in the same way as if direct current were applied to the circuits, that is, the polarizing coil creates a definite direction of magnetic flux with respect to the flux produced upon the magnet by the other coils. A change in the phase relation in one direction or the other from a 90 degree phase relation of the currents of the two circuits, corresponds in effect to changing the direction of current flow in one of the circuits where direct current is flowing.

In case a power factor below normal value and having a lagging current obtains upon the supply conductors 4, 5 and 6, a current flows through the current windings 15 and 16, which has such a vector relation to the current flowing through the potential winding 18 as to effect operation of the main magnet 11. In other words, with the indicated arrangement of windings of the magnet 11, the magnetic field of winding 18 will oppose the magnetic field of winding 15 and assist, or attract, the magnetic field of winding 16, which action will produce a preponderance of downward pull to cause engagement between the main contact members 29 and 30 for effecting operation of the two relays 13 and 14. The relay 13 short-circuits a portion of the resistor 34 for increasing the voltage of the exciter armature 9, and, accordingly, to over excite the synchronous condenser 1. The over excitation of the synchronous condenser 1 raises the power factor of the supply circuit in a well known manner. The relay 14 short-circuits a portion of the resistor 23 for increasing the energization of the auxiliary or vibratory magnet 12. The increased energization of the magnet 12 raises the core armature 24 and moves the bell-crank lever 25 to effect separation of the main contact members 29 and 30. Upon separation of contact members 29 and 30, the relays 13 and 14 are de-energized, whereupon the above operation may be repeated. So long as the indicated variation from unity power factor continues, the contact 29 will be held nearer the contact member 30 so that the length of time the resistor 34 is short-circuited is increased, and, hence, the exciter 7 will be caused to overexcite the condenser field-magnet winding 3. As the power factor again approaches unity, the pull upon the core armature 19 is gradually released to return the contact member 29 to its normal position. Obviously, as the contact member 29 is moved further away from the contact member 30, the length of engagement between the contact members is decreased, with the result that the voltage of the exciter will be correspondingly decreased in proportion to the approach of the power factor of the supply system to unity. Accordingly, such vibratory operation of the main contact members is maintained at varying rates to so govern the excitation of the synchronous condenser 1 as to maintain a constant power factor on the supply conductors 4, 5 and 6.

Should the power factor of the circuit 4, 5, 6 vary from the desired value by an increase in reactive component of the current, due to an increase in the capacitance of the circuit, the polarization of the core 19 by the winding 18 will be reversed so that the center of magnetic flux will shift from the lower portion of the coils toward the upper portion, causing the core to assume a higher position. This change in the position of the magnet core 19 causes the contact member 29 to move toward the right, thus decreasing the excitation of the machine 1.

If it is desired to maintain a power factor other than unity upon the supply conductors, the potential winding 18 of the magnet 11 is connected to the supply conductors 4, 5 and 6 by means of a Scott connection, as illustrated in Fig. 2 of the drawing. In the connection illustrated, a transformer coil 50 is directly connected across the supply conductors 4 and 6, and a transformer winding 51, having a plurality of taps extending from it, has one terminal directly connected to the supply conductor 5. A connection 52 is provided from a mid point of the transformer winding 50 to a point including 86.3% of the winding 51. The potential winding 18 of the main magnet 11 is connected to one terminal of the winding 50 and to one of the taps extending from the winding 51.

The vector relation of the current traversing the current windings 15 and 16, and the current traversing the potential winding 18 is illustrated in Fig. 3 of the drawing. The vector $c$ indicates the current traversing the windings 15 and 16, and the vector $v$ indicates the current traversing the potential winding 18. As is indicated in Fig. 3 of the drawing, the relation of the vectors $c$ and $v$ is varied in accordance with the tap extending from the winding 51, which is connected to the winding 18. Inasmuch as the above connection is old and well known in the art, further description of it is deemed unnecessary.

Modifications in the system, and in the arrangement and location of parts may be made within the spirit and scope of my invention, and such modifications are intended to be covered by the appended claims.

I claim as my invention:

1. In a power-factor regulator, the combination with a supply circuit and a synchronous condenser connected to said circuit, of means comprising a magnet having a core member, two differentially related current windings and one potential winding for varying the excitation of the synchronous condenser to maintain the power-factor of the supply circuit substantially constant, said windings being energized with one voltage and one current only.

2. In a power-factor regulator for a supply circuit, the combination comprising a main magnet having three windings, one winding for polarizing it, and two windings for operating it in accordance with the supply-circuit power factor, said windings being energized with one voltage and one current only, a synchronous condenser connected to the supply circuit, and means controlled by said magnet for varying the excitation of said condenser to control the power factor of the supply circuit.

3. In a power-factor regulator for a supply circuit, the combination with a synchronous condenser connected to the supply circuit, of means comprising an electromagnet energized in accordance with the power factor of the supply circuit for varying the excitation of the synchronous condenser to maintain the power factor of the supply circuit substantially constant, said electromagnet comprising two current windings and a stationary potential winding disposed between the current windings.

4. In a power-factor regulator, the combination comprising a main electromagnet and a vibratory electromagnet, said main magnet comprising two current windings and a potential winding located between the current windings, a synchronous condenser, a pair of contact members operated by said magnets, and means controlled by said contact members for governing the excitation of a synchronous condenser and for varying the energization of the vibratory magnet.

5. In a power-factor regulator, the combination comprising a supply circuit, a synchronous condenser connected to the supply circuit, and a regulator for varying the excitation of the synchronous condenser to maintain the power factor of the supply circuit substantially constant, said regulator comprising a main electromagnet and a vibratory electromagnet, the main electromagnet comprising two current coils and a potential coil disposed between the current coils.

6. In a system of regulation for maintaining the power factor of a supply circuit substantially constant, the combination with a synchronous condenser and an exciter therefor, of regulating means comprising a main magnet having a centrally disposed polarizing coil and two opposed current coils on opposite sides of said polarizing coil, said coils co-operating with a single core armature, and a second magnet co-operating with the first-mentioned magnet for varying the excitation of said condenser.

7. In a system of regulation for maintaining the power factor of a supply circuit substantially constant, the combination with a synchronous condenser, of regulating means therefor comprising a magnet having a single core armature adapted to occupy a predetermined neutral position and a plurality of current and voltage coils co-operating therewith, and adapted to actuate said armature in either direction.

8. A system of regulation for a synchronous condenser comprising a magnet having a polarizing coil and a plurality of current coils, said current coils being energized with one current, and a second magnet co-operating with the first-mentioned magnet.

9. In a regulating system for a supply circuit, the combination with means for supplying leading or lagging currents thereto, of a regulator for controlling said means, said regulator comprising an electromagnet having a single core armature and two current coils and one voltage coil for operating said electro-magnet in accordance with variations in the vectorial relation between the voltage and current of the supply circuit.

10. In a regulating system for a supply circuit, the combination with means for supplying leading or lagging currents thereto, of a regulator for controlling said means, said regulator comprising an electromagnet having a single core armature and a plurality of coils for operating said regulator in accordance with variations in the vectorial relation between the voltage and current of the supply circuit, and a co-operating vibratory electromagnet.

In testimony whereof, I have hereunto subscribed my name this 29th day of November, 1919.

CLARENCE A. BODDIE.